(12) United States Patent
Venetianer et al.

(10) Patent No.: US 7,391,907 B1
(45) Date of Patent: Jun. 24, 2008

(54) SPURIOUS OBJECT DETECTION IN A VIDEO SURVEILLANCE SYSTEM

(75) Inventors: Péter L. Venetianer, McLean, VA (US); Alan J. Lipton, Herndon, VA (US); Haiying Liu, Chantilly, VA (US); Paul C. Brewer, Arlington, VA (US); John I. W. Clark, Leesburg, VA (US)

(73) Assignee: ObjectVideo, Inc., Reston, VA (US)

( * ) Notice: Subject to any disclaimer, the term of this patent is extended or adjusted under 35 U.S.C. 154(b) by 415 days.

(21) Appl. No.: 10/954,309

(22) Filed: Oct. 1, 2004

(51) Int. Cl.
*G06K 9/64* (2006.01)
(52) U.S. Cl. .................. 382/224; 382/103; 382/168; 382/287
(58) Field of Classification Search ................. 382/133, 382/107, 224; 348/143, 155, 669
See application file for complete search history.

(56) References Cited

U.S. PATENT DOCUMENTS

| | | | | |
|---|---|---|---|---|
| 5,767,978 | A * | 6/1998 | Revankar et al. ............. | 358/296 |
| 5,896,190 | A * | 4/1999 | Wangler et al. ............. | 356/4.01 |
| 6,014,461 | A * | 1/2000 | Hennessey et al. .......... | 382/195 |
| 6,072,496 | A * | 6/2000 | Guenter et al. ............. | 345/419 |
| 6,411,326 | B1 * | 6/2002 | Tabata ........................ | 348/47 |
| 6,573,908 | B1 * | 6/2003 | Jang ............................ | 715/723 |
| 6,643,387 | B1 * | 11/2003 | Sethuraman et al. ........ | 382/107 |
| 7,050,622 | B2 * | 5/2006 | Morishima et al. .......... | 382/148 |
| 2001/0035907 | A1 * | 11/2001 | Broemmelsiek ............ | 348/169 |
| 2004/0085341 | A1 * | 5/2004 | Hua et al. .................... | 345/723 |
| 2004/0131249 | A1 * | 7/2004 | Sandrew ...................... | 382/162 |
| 2004/0151342 | A1 * | 8/2004 | Venetianer et al. .......... | 382/103 |
| 2005/0271280 | A1 * | 12/2005 | Farmer et al. ............... | 382/224 |
| 2006/0052923 | A1 * | 3/2006 | Farmer et al. ................. | 701/45 |

OTHER PUBLICATIONS

Wildes, R.P., "A measure of motion salience for surveillance applications", Oct. 4-7, 1998, IEEE, vol. 3, pp. 183-187.*
Russ, John C., "The Image Processing Handbook", 2002, CRC Press, 4th Ed., pp. 536-537, 542, 545-546, and 551-552.*
Pratt, William K., "Digital Image Processing", 2001, John Wiley and Sons, Inc., 3rd Ed., pp. 509-550.*
Russ C. John, "The Image Processing Handbook." 2002, CRC press, Ed. 4, pp. 536-537, 542, 545-546, and 551-552.*
Pass G., "Histogram refinement for content-based image retrieval," Dec. 2-4, 1996, pp. 96-102.*
Niels Haering and Niels da Vitoria Lobo, "Features and Classification Methods to Locate Deciduous Trees in Images"; Computer Vision and Image Understanding, vol. 75, Nos. 1/2, Jul./Aug., pp. 133-149, 1999.

* cited by examiner

*Primary Examiner*—Jingge Wu
*Assistant Examiner*—John W Lee
(74) *Attorney, Agent, or Firm*—Venable LLP; Caroline J. Swindell; Michael A. Sartori

(57) ABSTRACT

A system detects an object in frames of a video sequence to obtain a detected object, tracks the detected object in the frames of the video sequence to obtain a tracked object, and classifies the tracked object as a real object or a spurious object based on spatial and/or temporal properties of the tracked object.

33 Claims, 10 Drawing Sheets
(6 of 10 Drawing Sheet(s) Filed in Color)

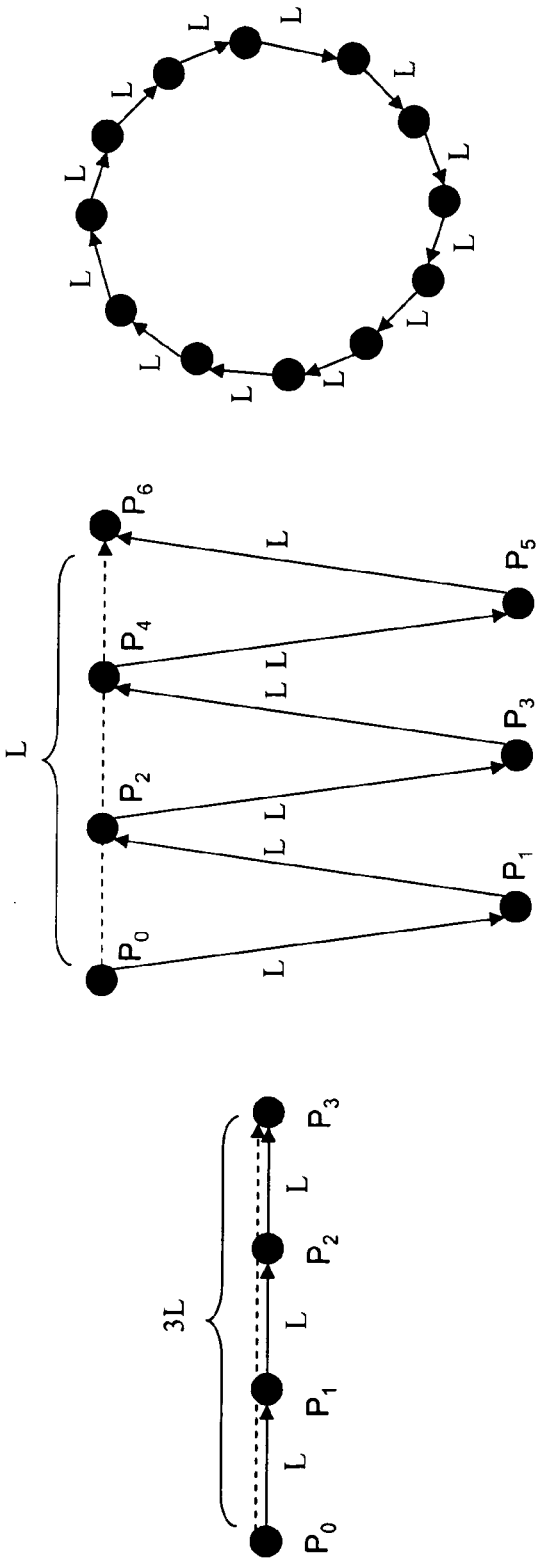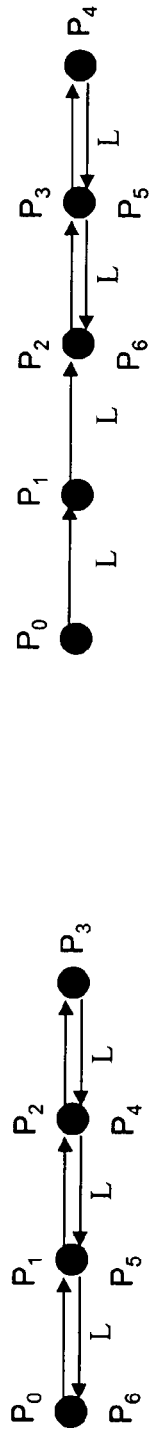
FIG. 6C
FIG. 7B
FIG. 6B
FIG. 6A
FIG. 7A

# SPURIOUS OBJECT DETECTION IN A VIDEO SURVEILLANCE SYSTEM

FIELD OF THE INVENTION

This invention relates to surveillance systems. Specifically, the invention relates to a video surveillance system that is configured to operate and detect objects in an all weather, 24/7 (i.e., 24 hours a day, seven days a week) environment.

BACKGROUND OF THE INVENTION

An intelligent video surveillance (IVS) system may be able to detect, track and classify objects in real-time. If the actions of an object are suspicious (i.e., deviate from normal behavior or violate one or more prescribed rules), the IVS system may send real-time alerts. The performance of the IVS system may primarily be measured by the effectiveness of these alerts, namely the detection rate and the false alarm rate. One factor affecting these two rates may include the quality of detecting and classifying the objects.

SUMMARY OF THE INVENTION

One embodiment of the invention includes a computer-readable medium comprising software, which when executed by a computer system, cause the computer system to perform operations comprising a method of: detecting an object in frames of a video sequence to obtain a detected object; tracking said detected object in said frames of said video sequence to obtain a tracked object; classifying said tracked object as a real object or a spurious object based on a spatial property and/or a temporal property of said tracked object. One embodiment of the invention includes an apparatus to perform a method to detect spurious objects, said method comprising detecting an object in frames of a video sequence to obtain a detected object, tracking said detected object in said frames of said video sequence to obtain a tracked object, classifying said tracked object as a real object or a spurious object based on a spatial property and/or a temporal property of said tracked object.

One embodiment of the invention includes a method to detect spurious objects, comprising: detecting an object in frames of a video sequence to obtain a detected object, tracking said detected object in said frames of said video sequence to obtain a tracked object, and classifying said tracked object as a real object or a spurious object based on a spatial property and/or a temporal property of said tracked object.

One embodiment of the invention includes a system to detect spurious objects, comprising: means for detecting an object in frames of a video sequence to obtain a detected object, means for tracking said detected object in said frames of said video sequence to obtain a tracked object, and means for classifying said tracked object as a real object or a spurious object based on a spatial property and/or a temporal property of said tracked object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other features and advantages of the invention will be apparent from the following, more particular description of the embodiments of the invention, as illustrated in the accompanying drawings.

FIGS. 6A, 6B, and 6C illustrate the determination of the salient motion metric according to an exemplary embodiment of the invention.

FIGS. 7A and 7B further illustrate the determination of the salient motion metric according to an exemplary embodiment of the invention.

DETAILED DESCRIPTION OF THE EMBODIMENTS

Figure 1:
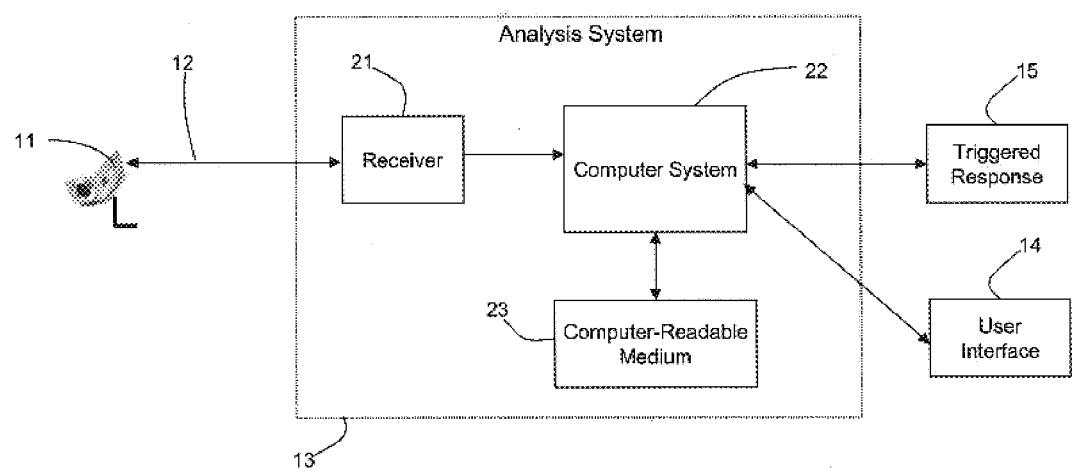
FIG. 1 illustrates an intelligent video surveillance system according to an exemplary embodiment of the invention.

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited herein is incorporated by reference.

A "video" refers to motion pictures represented in analog and/or digital form. Examples of video include: television, movies, image sequences from a video camera or other observer, and computer-generated image sequences.

A "video sequence" refers to some or all of a video.

In general, the invention may employ change detection to detect objects in a video sequence and may employ tracking and classification to differentiate between objects of interest and spurious objects.

The invention may be used both for real-time and non-real-time video processing applications (e.g., video surveillance, object-based video compression, or forensic analysis). For non-real-time video processing applications, the video may come from, for example, a computer-readable medium, a DVD, a HDD, or a network.

FIG. 1 illustrates an IVS system according to an exemplary embodiment of the invention. The IVS system may include a video camera 11, a communication medium 12, an analysis system 13, a user interface 14, and a triggered response 15.

The video camera 11 may be trained on a video monitored area and may generate output signals. Examples of the video camera 11 may include one or more of the following: a video camera; a digital video camera; a color camera; a monochrome camera; a camera; a camcorder; a PC camera; a webcam; an infra-red video camera; a thermal video camera; a CCTV camera; a pan, tilt, zoom (PTZ) camera; and a video sensing device. In an exemplary embodiment, the video camera 11 may be positioned to perform surveillance of an area of interest.

In one exemplary embodiment, the video camera 11 may be equipped to be remotely moved, adjusted, and/or controlled. With such video cameras, the communication medium 12 between the video camera 11 and the analysis system 13 may be bi-directional (shown), and the analysis system 13 may direct the movement, adjustment, and/or control of the video camera 11.

In one exemplary embodiment, the video camera 11 may include multiple video cameras monitoring the same video monitored area.

In one exemplary embodiment, the video camera 11 may include multiple video cameras monitoring multiple video monitored areas.

The communication medium 12 may transmit the output of the video camera 11 to the analysis system 13. The communication medium 12 may be, for example: a cable; a wireless connection; a network (e.g., a number of computer systems and associated devices connected by communication facilities; permanent connections (e.g., one or more cables); temporary connections (e.g., those made through telephone, wireless, or other communication links); an internet, such as the Internet; an intranet; a local area network (LAN); a wide area network (WAN); a combination of networks, such as an internet and an intranet); a direct connection; an indirect connection). If communication over the communication medium 12 requires modulation, coding, compression, or other communication-related signal processing, the ability to perform such signal processing may be provided as part of the video camera 11 and/or separately coupled to the video camera 11 (not shown).

The analysis system 13 may receive the output signals from the video camera 11 via the communication medium 12. The analysis system 13 may perform analysis tasks, including necessary processing according to the invention. The analysis system 13 may include a receiver 21, a computer system 22, and a computer-readable medium 23.

The receiver 21 may receive the output signals of the video camera 11 from the communication medium 12. If the output signals of the video camera 11 have been modulated, coded, compressed, or otherwise communication-related signal processed, the receiver 21 may be able to perform demodulation, decoding, decompression or other communication-related signal processing to obtain the output signals from the video camera 11, or variations thereof due to any signal processing. Furthermore, if the signals received from the communication medium 12 are in analog form, the receiver 21 may be able to convert the analog signals into digital signals suitable for processing by the computer system 22. The receiver 21 may be implemented as a separate block (shown) and/or integrated into the computer system 22. Also, if it is unnecessary to perform any signal processing prior to sending the signals via the communication medium 12 to the computer system 22, the receiver 21 may be omitted.

The computer system 22 may be coupled to the receiver 21, the computer-readable medium 23, the user interface 14, and the triggered response 15. The computer system 22 may perform analysis tasks, including necessary processing according to the invention. In general, the computer system 22 may refer to one or more apparatus and/or one or more systems that are capable of accepting a structured input, processing the structured input according to prescribed rules, and producing results of the processing as output. Examples of the computer system 22 may include: a computer; a stationary and/or portable computer; a computer having a single processor or multiple processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP) or a field-programmable gate array (FPGA); a distributed computer system for processing information via computer systems linked by a network; two or more computer systems connected together via a network for transmitting or receiving information between the computer systems; and one or more apparatus and/or one or more systems that may accept data, may process data in accordance with one or more stored software programs, may generate results, and typically may include input, output, storage, arithmetic, logic, and control units.

The computer-readable medium 23 may include all necessary memory resources required by the computer system 22 for the invention and may also include one or more recording devices for storing signals received from the communication medium 12 and/or other sources. In general, the computer-readable medium 23 may refer to any storage device used for storing data accessible by the computer system 22. Examples of the computer-readable medium 23 may include: a magnetic hard disk; a floppy disk; an optical disk, such as a CD-ROM and a DVD; a magnetic tape; and a memory chip. The computer-readable medium 23 may be external to the computer system 22 (shown) and/or internal to the computer system 22.

The user interface 14 may provide input to and may receive output from the analysis system 13. The user interface 14 may include, for example, one or more of the following: a monitor; a mouse; a keyboard; a touch screen; a printer; speakers and/or one or more other input and/or output devices. Using user interface 14, a user may provide inputs to the analysis system 13, including those needed to initialize the analysis system 13, provide input to analysis system 13, and receive output from the analysis system 13.

The triggered response 15 may include one or more responses triggered by the analysis system. Examples of the triggered response 15 include: initiating an alarm (e.g., audio, visual, and/or mechanical); controlling an audible alarm system (e.g., to notify the target, security personnel and/or law enforcement personnel); controlling a silent alarm system (e.g., to notify security personnel and/or law enforcement personnel); accessing an alerting device or system (e.g., pager, telephone, e-mail, and/or a personal digital assistant (PDA)); sending an alert (e.g., containing imagery of the violator, time, location, etc.) to a guard or other interested party; logging alert data to a database; taking a snapshot using the video camera 11 or another camera; culling a snapshot from the video obtained by the video camera 11; recording video with a video recording device (e.g., an analog or digital video recorder); controlling a PTZ camera to zoom in to the target; controlling a PTZ camera to automatically track the target; performing recognition of the target using, for example, biometric technologies or manual inspection; closing one or more doors to physically prevent a target from reaching an intended target and/or preventing the target from escaping; controlling an access control system to automatically lock, unlock, open, and/or close portals in response to the passback event; or other responses.

Figure 2:
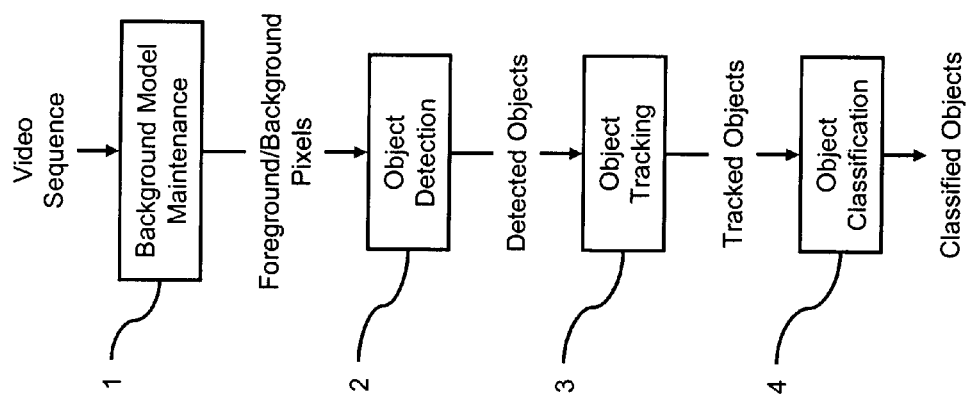
FIG. 2 illustrates a flow diagram for an intelligent video surveillance system according to an exemplary embodiment of the invention.

FIG. 2 illustrates a flow diagram for an intelligent video surveillance system according to an exemplary embodiment of the invention. The flow diagram may include background model maintenance (block 1), object detection (block 2), object tracking (block 3), and object classification (block 4). In block 1, the background model maintenance may model the temporal behavior of each pixel and marks pixels not conforming to this model as foreground pixels. In block 2, the object detection may spatially group the foreground pixels from block 1 into detected objects of the foreground. In block 3, the object tracking may temporally connect the detected objects from block 2. In block 4, the object classification may aim to categorize the tracked objects from block 3 and, further, may initiate a triggered response 15, as appropriate and desired.

Figure 3:
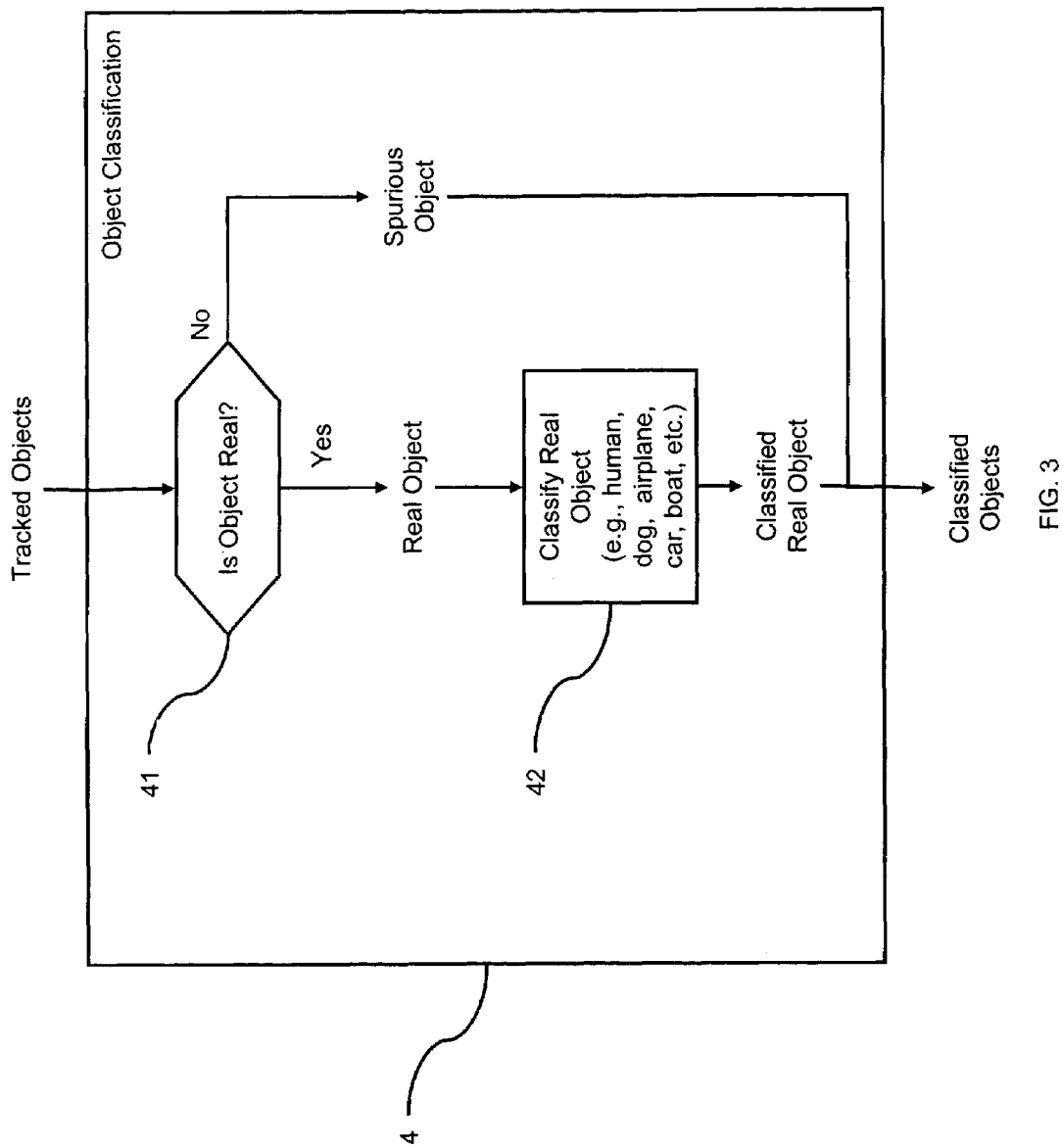
FIG. 3 illustrates a flow diagram for object classification for block 4 of FIG. 2 according to an exemplary embodiment of the invention.

FIG. 3 illustrates an exemplary flow diagram for the object classification of block 4 in FIG. 2. In block 41, for each tracked object, a determination may be made as to whether the tracked object is a real object or a spurious object. A real object may refer to an object that moves at least for some time and may be of interest to the user of the invention. For example, for a video surveillance application, a real object may generate legitimate alerts (e.g., a human, a vehicle, a dropped bag, etc.). As another example, for an object-based low bitrate video compression application, a real object may be what needs to be encoded as an object (e.g., a human, an animal, a vehicle, etc.). In contrast, a spurious object may refer to a detected object corresponding to an optical illusion or to an object that may be of no interest to the user of the invention. For example, for a video surveillance application, such objects may not generate legitimate alerts (e.g., leaves blowing in the wind, a flag waving, sun glitter on water, etc.). If the tracked object is determined not to be a real object, the object may be classified as a spurious object. If the tracked object is determined to be a real object, flow may proceed to block 42. In block 42, the real object may be classified as to its type (e.g., to differentiate between humans, vehicles, animals, etc.).

The remainder of the discussion addresses the classification problem in block 41, namely determining whether a tracked object is a real object or a spurious object. Classifying objects into one of the two categories (i.e., real objects, or spurious objects) may be very important in a wide range of applications, such as, for example, video surveillance. If background motion, such as, for example, leaves blowing in the wind, is tracked and treated as a real moving object, it may easily cause false alarms. Further, these types of objects may trigger an alert if the rule is to detect any motion in a sensitive area, or the detected spurious object may even cross virtual tripwires, initiating an alert that an object entered an area. In a surveillance application using an IVS system, false alarms may be very costly for two reasons. First, since every alarm needs to be investigated by a person (or persons), the false alarm may require human resources to respond to it, and investigate it, which may potentially take resources from other important tasks. Second, false alarms may decrease the confidence of the user in the IVS system, which may lead to ignoring alarms, even true alarms. In an object-based video compression application, spurious objects may compete for bandwidth with real objects, thus reducing image quality.

The result of the classification of objects as real objects or spurious objects may be used in several different ways. As an option, the IVS system may simply ignore spurious objects. Alternatively, the system may have a spurious object classification category, and a user may choose whether to see alerts with spurious objects or not. The latter option may be particularly useful when combined with homeland security alert levels for countering terrorism. For example, in a high alert mode, the IVS system may be changed to be more sensitive and to alert even on spurious objects (or at least low confidence spurious objects) (i.e., to err towards safety), with more false alarms but fewer missed detections. On the other hand, in a normal alert mode, spurious object may be ignored.

The invention may also be used in other counter-terrorism applications. With the invention, spurious objects may not need to be further classified and acted upon by a video surveillance system. For example, if the video surveillance system is monitoring a harbor and the area surrounding a naval vessel, the video surveillance system employing the invention may avoid further classifying and triggering a response for sun glitter on the water approaching the naval vessel (classified as a spurious object) and, instead, may focus on vessels approaching the naval vessel (classified as real objects). With the video surveillance system employing the invention, when real objects are tracked in the area, a triggered response 15 may be generated.

An exemplary embodiment of the invention uses a wide range of classification metrics based on spatial and temporal properties of the tracked object and combines these classification metrics to determine whether the object is a real object or a spurious object. The following sections describe some classification metrics that may be useful in measuring these differences, and thereby differentiating between real objects and spurious objects in block 41.

Figure 4:
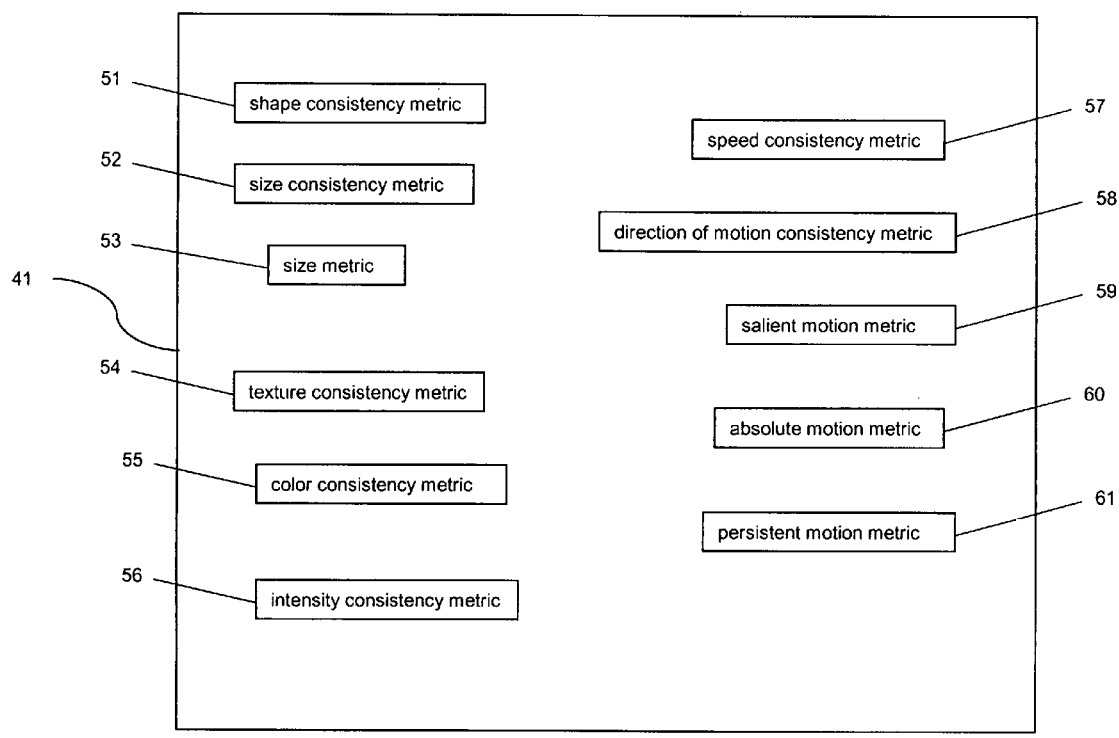
FIG. 4 illustrates a block diagram for the block 41 of FIG. 3 according to an exemplary embodiment of the invention.

FIG. 4 illustrates the exemplary classification metrics used for block 41 and discussed herein. The classification in block 41 may use one or more of the following eleven classification metrics in any combination: a shape consistency metric 51, a size consistency metric 52, a size metric 53, a texture consistency metric 54, a color consistency metric 55, an intensity consistency metric 56, a speed consistency metric 57, a direction of motion consistency metric 58, a salient motion metric 59, an absolute motion metric 60, and a persistent motion metric 61.

In addition to these eleven specific classification metrics, other classification metrics may be used. Generally, the following are examples of other classification metrics which may be used with the invention: an object property metric (where examples of an object property may include: shape, size, texture, color, intensity, speed, direction of motion, width, height, number of corners, aspect ratio, or classification of an object); a consistency metric based on an object property; and a motion metric based on a type of motion of an object (where examples of a type of motion of an object may include: salient motion, absolute motion, or persistent motion). Other classification metrics for use with the invention may become apparent to those in the art once the teachings of the invention are understood.

1. Shape Consistency Metric

Figure 5A:
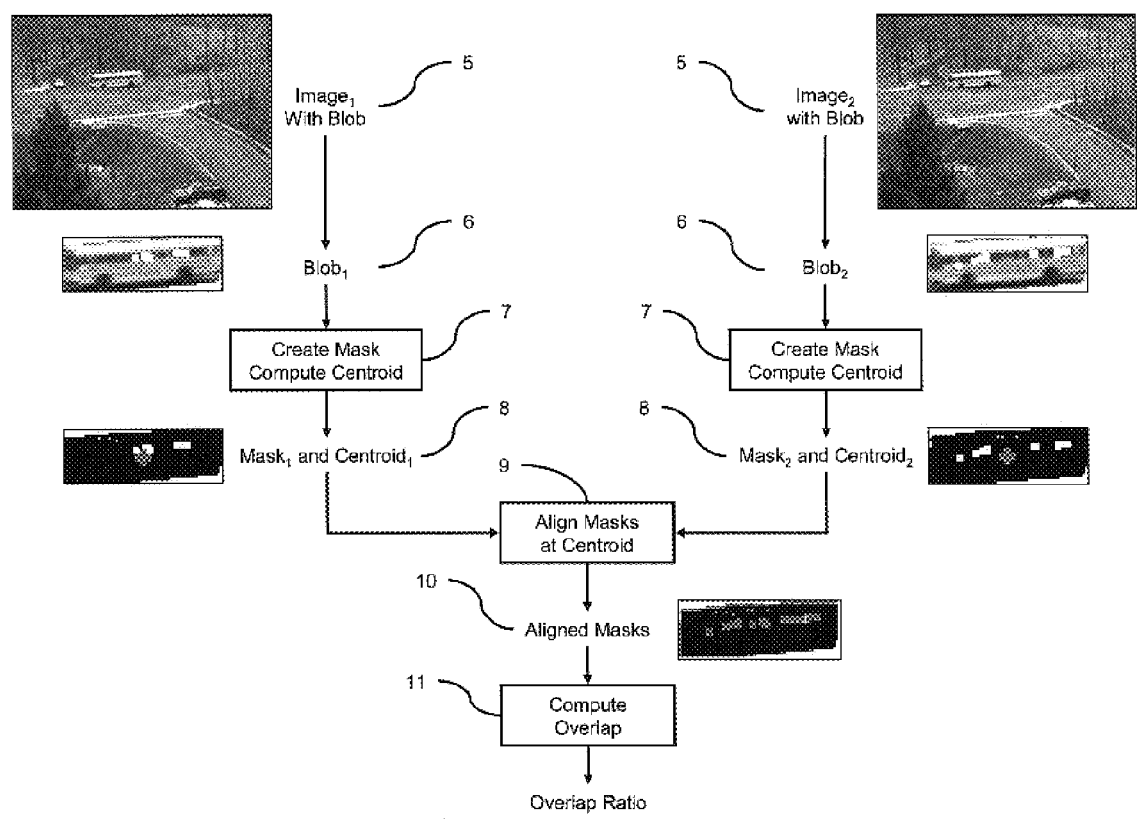
FIGS. 5A, 5B, 5C, and 5D illustrate a flow diagram to determine the shape consistency metric for an exemplary embodiment of the invention. The technique is illustrated on moving rigid objects (FIGS. 5A and 5B), non-rigid objects (FIG. 5C), and spurious objects (FIG. 5D).
Figure 5B:
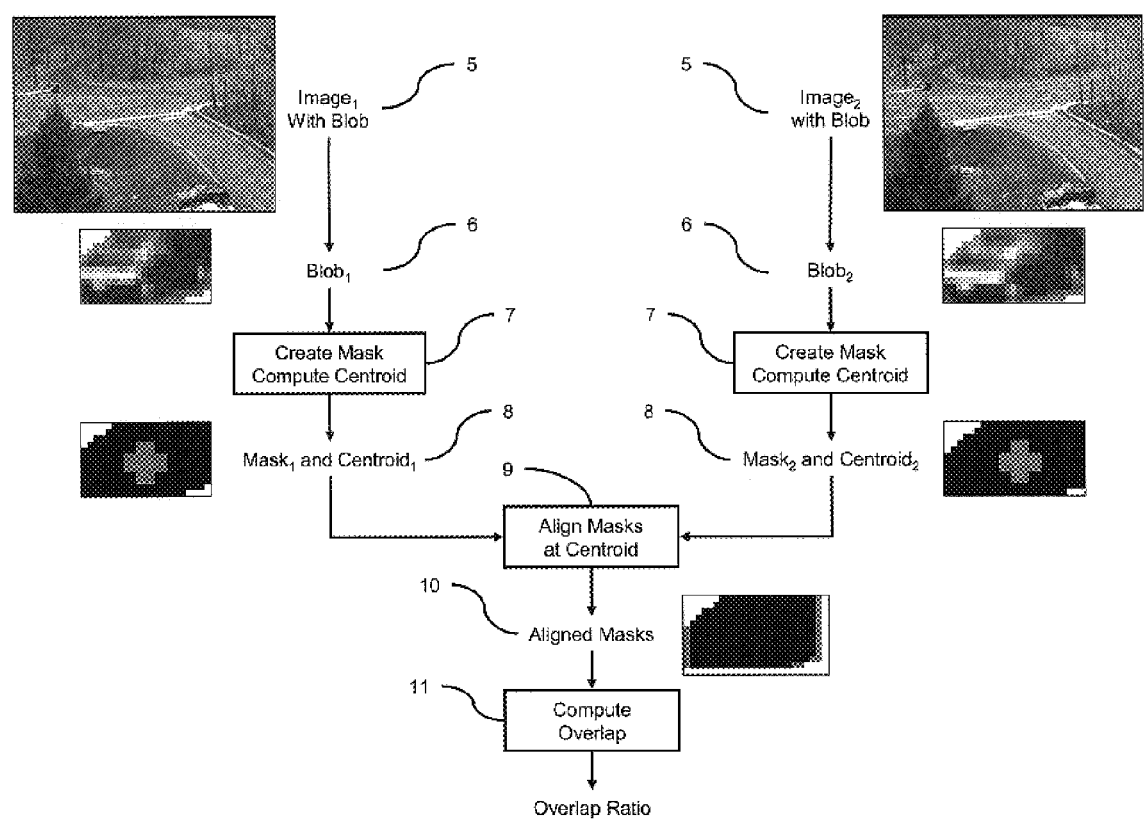
Figure 5C:
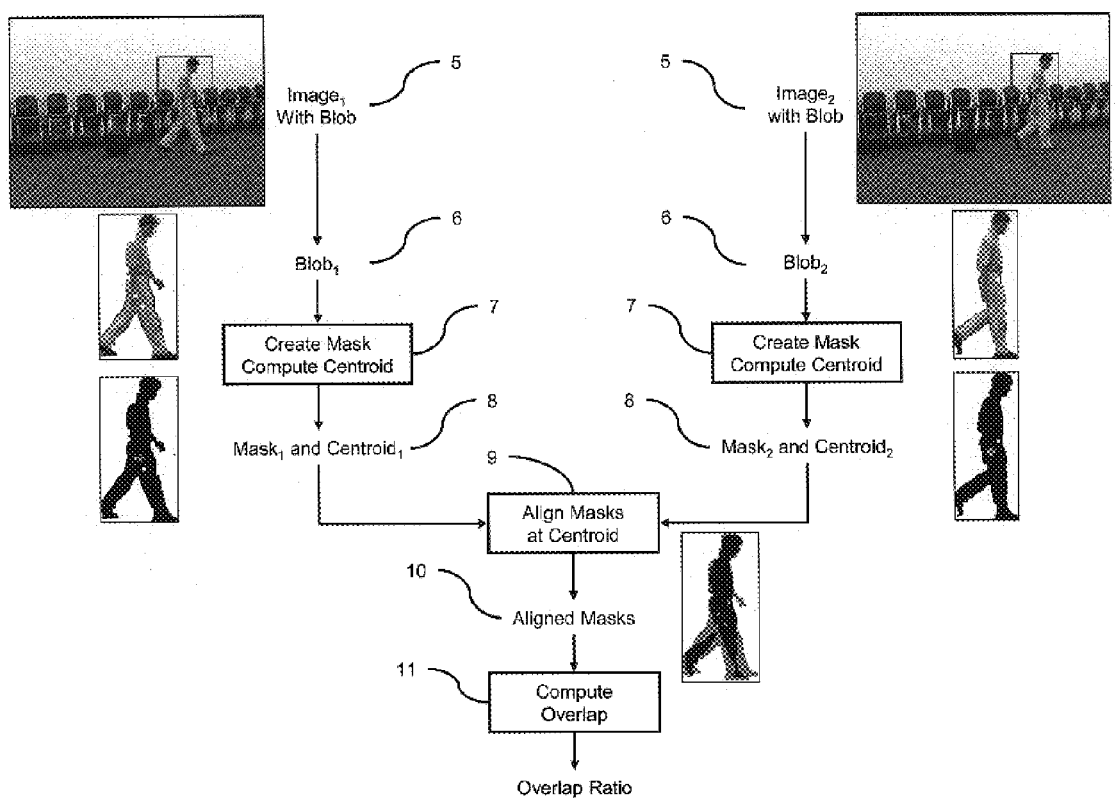
Figure 5D:
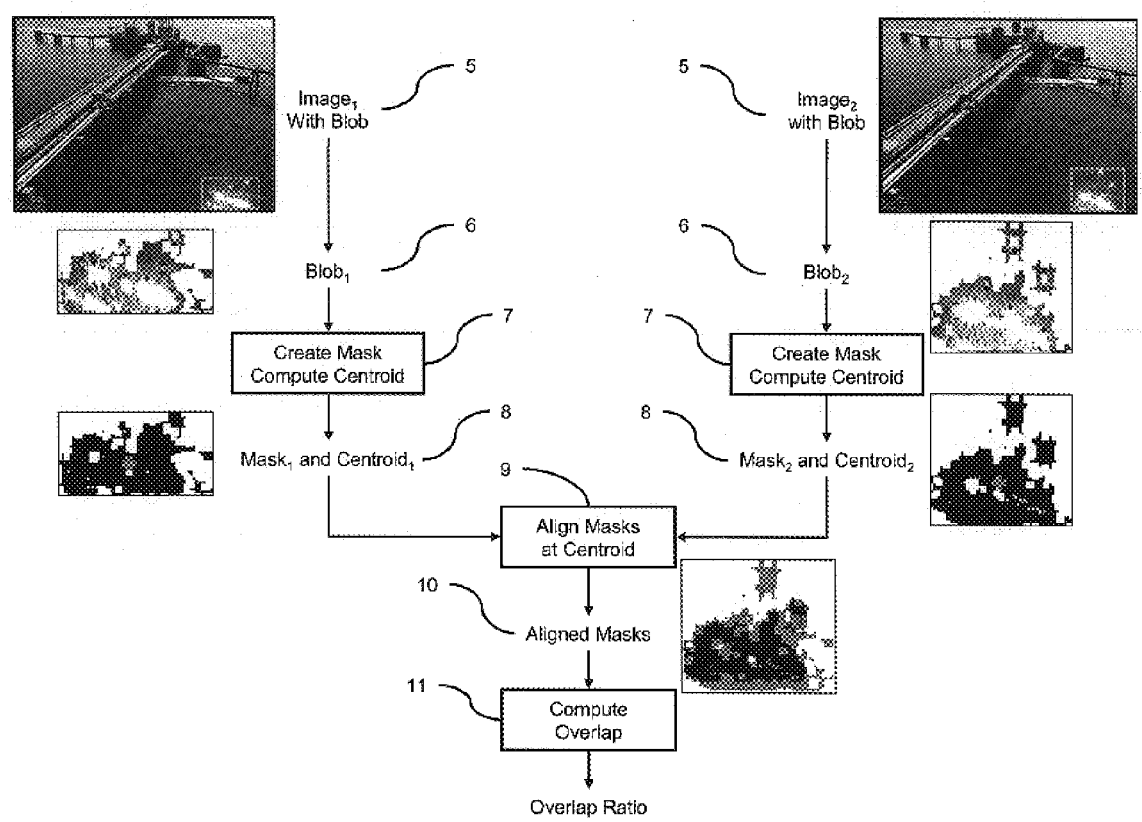

The shape of a real object may change only moderately from frame to frame, and a shape consistency metric may embody how much an object changes from one frame to the next. FIGS. 5A, 5B, 5C, and 5D illustrate a flow diagram of an exemplary embodiment for processing video to determine the shape consistency metric. The figures further illustrate that the shape consistency metric may yield very different values depending on the type of the object being examined. For example, FIGS. 5A and 5B illustrate moving rigid objects, FIG. 5C illustrates non-rigid objects, and FIG. 5D illustrates spurious objects.

FIGS. 5A to 5D may include the same blocks. At reference numeral 5, two consecutive frames (or snapshots) may be acquired. The two consecutive frames indicate the frame-to-frame displacement of the object. The four figures illustrate frames with different types of exemplary targets, which may be referred to as an image with a blob. At reference numeral 6, an enlarged view of the object, which may be referred to as the blob, may be extracted for further processing using object detection and tracking as in blocks 2 and 3. In block 7, a mask for each blob may be created, and a centroid for each blob may be computed. The mask may be a Boolean mask representing foreground (black) and background (white) pixels. At reference numeral 8, the mask and centroid for each blob is illustrated. The centroid is indicated on the mask with a gray cross. In block 9, the two masks may be aligned by their centroids. The resulting aligned mask, as exemplary illustrated at reference numeral 10, may include black pixels representing overlapping pixels and gray pixels representing pixels that are present only in one of the two masks, which indicates the frame-to-frame differences between the two masks, and the blobs. Finally, in block 11, an overlap ratio may be computed from the aligned masks from block 9. The overlap ratio may be a ratio of the number of overlapping pixels in the aligned masks (i.e., the number of the black pixels) to the total number of pixels in the aligned masks (i.e., the number of black and gray pixels). In the aligned masks, the higher the gray pixel to black pixel ratio, the smaller the overlap may be, and the more inconsistent the shape may be.

In FIGS. 5A to 5D, blocks 7, 9, and 11 may be performed as part of block 41.

In FIGS. 5A and 5B, as indicated by the aligned mask, the shape of the rigid object (e.g., a vehicle) may not change at all or only minimally, due to, for example, changing direction, small lighting changes, or the object moving closer/further. In FIG. 5C, as indicated by the aligned mask, the shape of a non-rigid object (e.g., a human) may change only moderately, as, for example, the limbs move. On the other hand, in FIG. 5D, as indicated by the large number of gray pixels on the aligned mask, the shape of spurious objects (e.g., sun glitter on water) may change drastically from frame to frame.

As an exemplary embodiment, the shape consistency metric ($C_{shape}$) may be computed from the number of overlapping pixels ($N_{ovl}$) and the number of pixels of the object in two consecutive frames ($N_1$ and $N_2$) using the following formula:

$$C_{shape} = \frac{2 * N_{ovl}}{N_1 + N_2}$$

The higher the value of the metric, the more consistent the shape of the object may be, and the more likely that the object may be a real object.

For another exemplary embodiment, a mathematical shape description (e.g., B-spline) may be used to represent the shape of an object and to compute the frame-to-frame shape difference as the shape consistency metric.

For a further exemplary embodiment, evenly spaced control points may be selected on the object contour, and the frame-to-frame distance of these control points may provide the shape consistency metric.

2. Size Consistency Metric

The image size of real objects may change only moderately from frame to frame. Due to the effect of the camera imaging geometry, the image size of objects may change frame-to-frame for several reasons. For example, the object may move closer or further from the camera; the object may turn, thus exposing a different dimension towards the camera; or in case of non-rigid objects, the object may partially occlude itself. However, for real objects, these changes may be gradual and moderate from frame to frame, while the size of spurious objects may change drastically.

As an exemplary embodiment for determining the size consistency metric, the size consistency metric may measure the number of pixels in the detected object in consecutive frames and computes their ratio. The size consistency metric ($C_{size}$) may be computed from the number of pixels in the object in two consecutive frames ($N_1$ and $N_2$) using the following formula:

$$C_{size} = 1 - \frac{|N_1 - N_2|}{N_1 + N_2}$$

The higher the value of the metric, the more consistent the size of the object may be, and the more likely that the object may be a real object.

3. Size Metric

If the IVS system has some knowledge regarding the reasonable size of real objects in the scene, the size of the tracked object may serve as an indicator as to whether the object is a real object or a spurious object. For example, if all the leaves of a tree blowing in the wind are tracked as a single large object, that object may be significantly bigger than a human or even a car would be at the same location. Conversely, a single leaf may be much smaller than a real object of interest. Therefore, anything as big as a tree or as small as a leaf may be categorized as spurious if the normal size of the expected real objects is known.

As an exemplary embodiment for determining the size metric, if calibration information is available and if the IVS system can compute the real word size of the detected object, the size may be compared to typical object sizes for the environment (e.g., how big a vehicle or a human may be). Alternatively, even without calibration, the IVS system may record the image size of all detected objects over an extended learning period, may learn a normal size pattern from the recorded images sizes, and may mark all tracked objects deviating from the normal size pattern as spurious objects. The more standard deviations that the measured size of the tracked object may be away from the mean size at a given location, the more likely that the object may be a spurious object.

As an exemplary embodiment, the size metric ($M_{size}$) may be computed from the current size ($v_{size}$), the mean of the size at a given position ($\mu_{size}$) and the standard deviation of the size at a given position ($\sigma_{size}$) using the following formula:

$$M_{size} = \frac{\sigma_{size}}{|v_{size} - \mu_{size}| + \sigma_{size}}$$

The higher the value of the metric, the closer the size of the object may be to the normal size pattern, and the more likely that the object may be a real object.

4. Texture Consistency Metric

The overall texture of real objects may be expected to be more consistent over time than that of spurious objects. Several texture measures are described in the literature (see, e.g., Niels Haering and Niels da Vitoria Lobo, "Features and Classification Methods to Locate Deciduous Trees in Images," *Computer Vision and Image Processing* (CVIU), v. 75, Bo. 1-2, pp. 133-149, 1999), such as, for example, Gabor filter based measures, co-occurrence matrix measures, fractal dimension measures, or entropy measures, etc. The choice of which texture measure may be highly dependent on image content.

As an exemplary embodiment for determining the texture consistency metric, after computing the object texture in consecutive frames ($T_1$ and $T_2$) using a desired texture measure, the texture consistency metric ($C_{texture}$) may be obtained using the following formula:

$$C_{texture} = 1 - \frac{|T_1 - T_2|}{T_1 + T_2}$$

The higher the value of the metric, the more consistent the texture of the object may be, and the more likely that the object may be a real object.

5. Color Consistency Metric

The overall color of real objects may be expected to be consistent from frame to frame, with only slight changes due to, for example, overall illumination changes, shadows cast over the tracked object, direction changes, or self-occlusions.

As an exemplary embodiment for determining the color consistency metric, the color histogram of the object may be computed in consecutive frames using a preferred color space and quantization. The color histogram (HC) for the past n frames may be represented as a vector with m elements, where each element of the vector represents a value of the color histogram. With the color histogram vectors for two consecutive frames ($HC_1$ and $HC_2$), a color consistency vector ($L_{color}$) having m elements may be obtained using the following formula:

$$L_{color}(i) = 1 - \frac{|HC_1(i) - HC_2(i)|}{HC_1(i) + HC_2(i)}, \text{ for } i = 1 \text{ to } m$$

The color consistency metric ($C_{color}$) may be obtained using the following formula:

$$C_{color} = \frac{\sum_{i=1}^{m} L_{color}(i)}{m}$$

The higher the value of the metric, the more consistent the color of the object may be, and the more likely that the object may be a real object.

6. Intensity Consistency Metric

The overall intensity of real objects may be expected to be consistent from frame to frame, with only slight changes due to, for example, overall illumination changes, shadows cast over the tracked object, direction changes, or self-occlusions.

As an exemplary embodiment for determining the intensity consistency metric, the average intensity metric of the object may be computed in two consecutive frames ($I_1$ and $I_2$), and the intensity consistency metric ($C_{intensity}$) may be obtained using the following formula:

$$C_{intensity} = 1 - \frac{|I_1 - I_2|}{I_1 + I_2}$$

The higher the value of the metric, the more consistent the average intensity of the object may be, and the more likely that the object may be a real object.

Alternatively, an intensity histogram (HI) for the past n frames may be represented as a vector with m elements, where each element represents a value of the intensity histogram. With the intensity histogram vectors for two consecutive frames ($HI_1$ and $HI_2$), an intensity consistency vector ($L_{intensity}$) having m elements may be obtained using the following formula:

$$L_{Intensity}(i) = 1 - \frac{|HI_1(i) - HI_2(i)|}{HI_1(i) + HI_2(i)}, \text{ for } i = 1 \text{ to } m$$

The alternative intensity consistency metric ($C'_{intensity}$) may be obtained using the following formula:

$$C'_{intensity} = \frac{\sum_{i=1}^{m} L_{intensity}(i)}{m}$$

The higher the value of the metric, the more consistent the intensity histograms of the object may be, and the more likely that the object may be a real object.

7. Speed Consistency Metric

The speed of real objects may be consistent from frame to frame, usually with gradual, moderate changes. Although sudden starts and stops may occur with real objects, these may be instantaneous, and around these sudden starts and stops, the speed of real objects may usually be consistent. In contrast, the speed of spurious objects may often rapidly change.

As an exemplary embodiment for determining the speed consistency metric, the speed consistency metric ($C_{speed}$) may be computed from the instantaneous speed of the object in two consecutive frames ($v_1$ and $v_2$) using the following formula:

$$C_{speed} = 1 - \frac{|v_1 - v_2|}{v_1 + v_2}$$

The higher the value of the metric, the more consistent the speed of the object may be, and the more likely that the object may be a real object.

8. Direction of Motion Consistency Metric

The direction of motion of real objects may be consistent from frame to frame, usually with gradual, moderate changes. While sudden changes of direction may occur for real objects, these are rare, and around sudden changes, the direction of motion may usually be consistent. In contrast, the direction of motion of spurious objects may often rapidly change.

As an exemplary embodiment for determining the direction of motion consistency metric, the direction of motion consistency metric ($C_{motion}$) may be computed from the instantaneous direction of motion of the object in two consecutive frames ($\phi_1$ and $\phi_2$, representing the angle of the motion vector), using the following formula:

$$C_{motion} = \begin{cases} 1 - \frac{|\varphi_1 - \varphi_2|}{\pi}, & \text{for } |\varphi_1 - \varphi_2| \leq \pi \\ \frac{|\varphi_1 - \varphi_2|}{\pi} - 1, & \text{for } |\varphi_1 - \varphi_2| > \pi \end{cases}$$

The higher the value of the metric, the more consistent the direction of motion of the object may be, and the more likely that the object may be a real object.

9. Salient Motion Metric

The salient motion metric (or the motion salience metric) may be a measure of the purposefulness of the motion of an object. The motion of real objects may be purposeful, or salient (i.e., the object is going somewhere), while the motion of spurious objects may usually be random, or insalient. For example, foliage blowing in the wind may be in constant motion, but the motion may be back-and-forth, without actually going anywhere, and be insalient As an exemplary embodiment for determining the salient motion metric, the salient motion metric ($M_{salient}$) may be computed from the position of the object over a window of interest of n consecutive frames ($P_1 \ldots P_n$) using the following formula:

$$M_{salient} = \frac{P_n - P_1}{\sum_{i=1}^{n-1} |P_{i+1} - P_i|}$$

In the above formula, the numerator may provide the distance between the object position at the start and end times of the window of interest, and the denominator may be the total distance traveled by the object. The higher the value of the metric, the more salient the motion of the object may be, and the more likely that the object may be a real object.

FIGS. 6A, 6B, and 6C illustrate the salient motion metric for various examples. In the three figures, the solid arrows may represent the actual path of the object, the dots may represent the object positions ($P_i$) at different snapshots, and the dashed arrows may represent the numerator of the metric (i.e., the distance between the object position at the start and end times of a window of interest). The metric S may be computed as the length of the dashed arrow divided by the sum of the lengths of the solid arrows.

In FIG. 6A, the object may be moving along a straight line. Hence, the frame-to-frame motion ($P_0 \to P_1 \to P_2 \to P_3 = 3L$) and the overall motion ($P_0 \to P_3 = 3L$) may both be equal. Thus, the salience of the motion may be large, and the salient motion metric may be 1:

$$S = \frac{3L}{3L} = 1$$

In FIG. 6B, the object may be moving in a zigzag pattern. Hence, the frame-to-frame motion ($P_0 \to P_1 \to P_2 \to P_3 \to P_4 \to P_5 \to P_6 = 6L$) may be significantly larger than the overall motion ($P_0 \to P_6 = L$). Thus, the salience of the motion may be very low, and the salient motion metric may be 0.17:

$$S = \frac{L}{6L} = 0.17$$

In FIG. 6C, the object may be moving in a circle, ending up where it started. Hence, the frame-to-frame motion through all points may be large (12L) with no overall motion. Thus, the salience of the motion may be zero, and the salient motion metric may be 0:

$$S = \frac{0}{12L} = 0$$

A potential limitation of the above approach is that it may yield incorrectly low salience values for certain motion patterns, due to the time window of the salience computation overlapping with the motion pattern. To overcome this limitation, as another exemplary embodiment, the salient motion metric may be computed over different time windows. FIGS. 7A and 7B illustrate the salient motion metric for various examples and use the same nomenclature as in FIGS. 6A to 6C. In these figures, an object moving in one direction and then turning back may have a very low salient motion metric value.

In FIG. 7A, depending on the time window used to determine the salient motion metric, a different value may be obtained. For example, if the time window is large scale (e.g., 6 units), the salient motion metric may be 0:

$$S_{0 \to 6} = \frac{0}{6L} = 0$$

On the other hand, if the time window is small scale (e.g., 3 units) and averaged over multiple time windows, the salient motion metric may be 1:

$$\frac{S_{0 \to 3} + S_{3 \to 6}}{2} = \frac{\frac{3L}{3L} + \frac{3L}{3L}}{2} = 1$$

Similarly, in FIG. 7B, if the time window is large scale (e.g., 6 units), the salient motion metric may be 0.33:

$$S_{0 \to 6} = \frac{2L}{6L} = 0.33$$

On the other hand, if the time window is small scale (e.g., 3 units) and averaged over multiple time windows, the salient motion metric may be 0.66:

$$\frac{S_{0 \to 3} + S_{3 \to 6}}{2} = \frac{\frac{3L}{3L} + \frac{1L}{3L}}{2} = 0.66$$

As can be seen from the examples in FIGS. 7A and 7B, if the salient motion metric is computed over multiple time windows, the larger scale time window (e.g., $S_{0 \to 6}$) may yield a low value for the salient motion metric, while the smaller scale window (e.g., $S_{0 \to 3}$ and $S_{3 \to 6}$) may yield a large value for the salient motion metric. The examples illustrated in FIGS. 7A and 7B show that if multi-scale time windows are used, it may be important that even the smaller scale time windows be large enough to allow computing of a meaningful salient motion metric. The size of the time windows may also be application dependent.

10. Absolute Motion Metric

The absolute motion metric may measure how much an object really moves in a time window. Real objects may tend to move more than spurious objects.

As an exemplary embodiment for determining the absolute motion metric, the metric may be computed as the distance between the object position at the start and the end of a time window of n consecutive frames ($P_1 \ldots P_n$). The absolute motion metric ($M_{absolute}$) may be computed using the following formula:

$$M_{absolute} = |P_n - P_1|.$$

The higher the value of the metric, the more the absolute motion of the object may be, and the more likely that the object may be a real object.

The absolute motion metric may be more useful if combined with calibration information. The number of pixels of displacement may correspond to different amounts of real world motion. The amount of motion may depend on where the motion occurs in the scene, such as, for example, whether the motion occurs close to or far from the camera, or whether the motion occurs along the camera axis (i.e., the motion occurs towards or away from the camera) or perpendicular to the camera axis.

Figure 8:
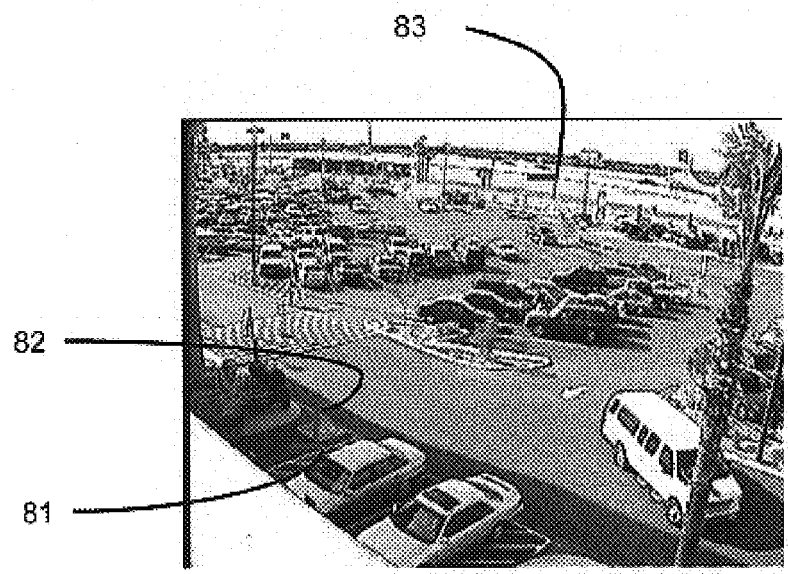
FIG. 8 illustrates the determination of the absolute motion metric according to an exemplary embodiment of the invention.

FIG. 8 illustrates the effects of calibration for use with the absolute motion metric. In FIG. 8, a typical surveillance scenario is depicted. The bars 81, 82, and 83 may be of the same pixel length, but correspond to different absolute sizes. Although both bars 81 and 82 are near field, the horizontal bar 81 may be significantly shorter than the diagonal of the handicapped sign, while the vertical 82 may be longer than the diagonal. Bars 81 and 82 may approximately correspond to 3 feet and 5 feet of absolute length, respectively. In contrast, bar 83 in the far field may be longer than a car and may correspond to approximately 17 feet of absolute length. With proper calibration, as in the example in FIG. 8, the absolute motion metric may be more useful.

11. Persistent Motion Metric

Real objects may normally be tracked for extended periods of time, while spurious objects may often quickly appear and disappear. So, the longer an object may be tracked (i.e., the more persistent the motion of the object), the more likely the object is a real object.

As an exemplary embodiment for determining the persistent motion metric (or persistence motion metric), the metric may be computed over a window of interest having a number of consecutive frames (nwindow), where the object is tracked over a number of the frames in the window ($n_{tracked}$). The persistent motion metric ($M_{persistent}$) may be computed using the following formula:

$$M_{persistent} = \frac{n_{tracked}}{n_{window}}$$

The higher the value of the metric, the more persistent the motion of the object may be, and the more likely that the object may be a real object.

12. Combining Metrics

A combination of all or some of the above metrics may be used to perform object classification in block 41. The classification metrics may be combined using any techniques well known in the art for combining measurements. For example, the classification metrics may be combined using neural networks, linear discriminant analysis, and/or non-linear weighting of the classification metrics.

In an exemplary embodiment, the above metrics may be combined by: (1) averaging each metric over a short time window to obtain a time-averaged metric, which results in more reliable data; and (2) performing linear discriminant analysis on the time-averaged metrics to determine which metrics to use and what weights may be the best for a given scene type.

The selection of metrics and how to combine them may depend on several factors. For example, the trade-off between false alarms and missed detections may be considered. Too aggressive spurious foreground detection may result in classifying certain real objects as spurious objects, which may potentially cause missed detections. For the examples of a person standing in front of a display or people standing and talking, a small amount of motion may result in the salient motion metric indicating that the object is a spurious object. On the other hand, if the classification is too lenient, spurious foreground may be classified as a real object, which may cause a false alarm. As an example, a white cap wave may often move in a very salient fashion.

These examples also illustrate that several other factors may influence how to classify real objects and spurious objects in block 41. These factors may include: the typical scenario, the expected types of real objects, the expected behavior of the real objects, the background, the computational complexity constraints of the system, the camera type, etc.

As an example, vehicles may yield greater values for several of the metrics list above, such as, for example, the size consistency metric, the shape consistency metric, the direction of motion consistency metric, and the salient motion metric. Hence, if no humans may be expected in the scene, the classification may be more aggressive.

As another example, different background objects, such as, for example, water and foliage, may have different properties. Hence, different algorithms may be needed depending on the background.

As another consideration, some of the classification metrics, such as, for example, the texture consistency metric and the color consistency metric, may be computationally more intensive than other classification metrics. Hence, in certain applications, the more computationally intensive classification metrics may not be used.

As another example, thermal cameras may not provide color information, and may require different texture-based classification metrics than a regular camera.

In a number of the classification metrics, results from two or more frames may be used. These frames may be consecutive or non-consecutive.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A computer-readable medium comprising software to detect spurious objects, which when executed by a computer system, cause the computer system to perform operations comprising a method of:

detecting an object in frames of a video sequence to obtain a detected object;

tracking said detected object in said frames of said video sequence to obtain a tracked object;

classifying said tracked object as a real object or a spurious object based on at least one of:

a shape consistency metric, including:
    extracting an enlarged view (blob) of said object for each of two frames;
    creating a mask for each blob;
    computing a centroid for each blob;
    aligning said masks by said centroids, whereby an aligned mask is created; and
    computing an overlap ratio from said aligned mask from a number of overlapping pixels in the aligned mask and a total number of pixels in said aligned mask,
a size consistency metric, including:
    measuring a number of pixels in said detected object in each of two frames; and
    computing the ratio of said number of pixels in each of said two frames,
a texture consistency metric,
a color consistency metric, including: computing a color histogram of said object in a plurality of frames, wherein said color histogram for n previous frames is a vector with m elements, where each element of said vector represents a value of said color histogram;
computing a color consistency vector using color histogram vectors for two frames; and
computing a color consistency metric based on said color consistency vector and m, an intensity consistency metric,
a speed consistency metric, including: computing an instantaneous speed of said object in two frames; and computing a speed consistency metric based on a change in said instantaneous speed in said two frames,
a direction of motion consistency metric, including: computing an instantaneous direction of motion of said object in two frames; and computing a direction of motion consistency metric based on a change in said instantaneous direction of motion in said two frames,
a salient motion metric,
an absolute motion metric, or
a persistent motion metric of said tracked object.

2. A computer-readable medium as in claim 1, further comprising classifying said object based on a size metric including:
    determining a current size of said object at a position in a frame;
    determining a mean size at said position;
    computing a standard deviation of a size at said position; and
    computing a size metric from said current size, said mean size and said standard deviation.

3. A computer-readable medium as in claim 1, wherein classifying said object based on a texture consistency metric comprises:
    computing an object texture for said object in two frames; and
    computing a texture consistency metric based on a change in said computed object textures in said two frames.

4. A computer-readable medium as in claim 1, wherein classifying said object based on a intensity consistency metric comprises:
    computing an average intensity metric of said object in two frames; and
    computing an intensity consistency metric based on a change in said average intensity metric in said two frames.

5. A computer-readable medium as in claim 1, wherein classifying said object based on a salient motion metric comprises:
    determining a position of said object over a window of interest of n frames;
    computing a salient motion metric based on a distance between said object position at the start and end times of said window of interest, and a total distance traveled by the object.

6. A computer-readable medium as in claim 1, wherein classifying said object based on an absolute motion metric comprises:
    computing a distance between a position of said object at a start and an end of a time window of n frames.

7. A computer-readable medium as in claim 1, wherein classifying said object based on a persistent motion metric comprises:
    computing a first number of frames in which said object appears over a window of interest having a second number of frames; and
    computing a persistent motion metric based on a ratio of said first number of frames to said second number of frames.

8. A computer-readable medium as in claim 1, wherein said object is classified based on at least two of said classification metrics.

9. A computer-readable medium as in claim 8, wherein said object is classified based on at least three of said classification metrics.

10. A computer-readable medium as in claim 9, wherein said object is classified based on at least four of said classification metrics.

11. A computer-readable medium as in claim 1, wherein said object is classified based on at least one time-averaged classification metric.

12. A computer-readable medium as in claim 1, wherein said object is classified based on a combination of at least two classification metrics, each said classification metric quantifying a spatial property and/or a temporal property of said tracked object.

13. A computer-readable medium as in claim 12, wherein said classification metrics are combined using neural networks.

14. A computer-readable medium as in claim 12, wherein said classification metrics are combined using linear discriminant analysis.

15. A computer-readable medium as in claim 12, wherein said classification metrics are combined using non-linear weighting.

16. A computer-readable medium as in claim 12, wherein said classification metrics are time-average weighted over at least one time window.

17. A computer-readable medium as in claim 1, wherein said method further comprising, if said object is classified as said real object, further classifying said real object as to a type of real object.

18. A computer-readable medium as in claim 1, wherein said method further comprising if said object is classified as said real object, initiating a triggered response.

19. A computer-readable medium as in claim 1, wherein said frames are consecutive.

20. A computer-readable medium as in claim 1, wherein said frames are non-consecutive.

21. An apparatus to perform a method to detect spurious objects, said method comprising:
    detecting an object in frames of a video sequence to obtain a detected object;

tracking said detected object in said frames of said video sequence to obtain a tracked object;
classifying said tracked object as a real object or a spurious object based on at least one of:
  a shape consistency metric, including:
    extracting an enlarged view (blob) of said object for each of two frames;
    creating a mask for each blob;
    computing a centroid for each blob;
    aligning said masks by said centroids, whereby an aligned mask is created; and
    computing an overlap ratio from said aligned mask from a number of overlapping pixels in the aligned mask and a total number of pixels in said aligned mask,
  a size consistency metric, including:
    measuring a number of pixels in said detected object in each of two frames: and
    computing the ratio of said number of pixels in each of said two frames,
  a texture consistency metric,
  a color consistency metric, including:
    computing a color histogram of said object in a plurality of frames, wherein said color histogram for n previous frames is a vector with m elements, where each element of said vector represents a value of said color histogram;
    computing a color consistency vector using color histogram vectors for two frames; and
    computing a color consistency metric based on said color consistency vector and m,
  an intensity consistency metric,
  a speed consistency metric, including:
    computing an instantaneous speed of said object in two frames; and
    computing a speed consistency metric based on a change in said instantaneous speed in said two frames,
  a direction of motion consistency metric, including:
    computing an instantaneous direction of motion of said object in two frames; and
    computing a direction of motion consistency metric based on a change in said instantaneous direction of motion in said two frames,
  a salient motion metric,
  an absolute motion metric, or
  a persistent motion metric of said tracked object.

22. An apparatus as in claim 21, wherein said object is classified based on at least two of said classification metrics.

23. An apparatus as in claim 22, wherein said object is classified based on at least three of said classification metrics.

24. An apparatus as in claim 23, wherein said object is classified based on at least four of said classification metrics.

25. A method to detect spurious objects, comprising:
detecting an object in frames of a video sequence to obtain a detected object;
tracking said detected object in said frames of said video sequence to obtain a tracked object;
classifying said tracked object as a real object or a spurious object based on at least one of the following classification metrics:
  a shape consistency metric, including:
    extracting an enlarged view (blob) of said object for each of two frames;
    creating a mask for each blob;
    computing a centroid for each blob;
    aligning said masks by said centroids, whereby an aligned mask is created; and
    computing an overlap ratio from said aligned mask from a number of overlapping pixels in the aligned mask and a total number of pixels in said aligned mask,
  a size consistency metric, including:
    measuring a number of pixels in said detected object in each of two frames; and
    computing the ratio of said number of pixels in each of said two frames,
  a texture consistency metric,
  a color consistency metric, including:
    computing a color histogram of said object in a plurality of frames, wherein said color histogram for n previous frames is a vector with m elements, where each element of said vector represents a value of said color histogram;
    computing a color consistency vector using color histogram vectors for two frames; and
    computing a color consistency metric based on said color consistency vector and m,
  an intensity consistency metric,
  a speed consistency metric, including:
    computing an instantaneous speed of said object in two frames; and
    computing a speed consistency metric based on a change in said instantaneous speed in said two frames,
  a direction of motion consistency metric, including:
    computing an instantaneous direction of motion of said object in two frames, and
    computing a direction of motion consistency metric based on a change in said instantaneous direction of motion in said two frames,
  a salient motion metric,
  an absolute motion metric, or
  a persistent motion metric of said tracked object.

26. A method as in claim 25, wherein said object is classified based on at least two of said classification metrics.

27. A method as in claim 26, wherein said object is classified based on at least three of said classification metrics.

28. A method as in claim 27, wherein said object is classified based on at least four of said classification metrics.

29. A system to detect spurious objects, comprising:
means for detecting an object in frames of a video sequence to obtain a detected object;
means for tracking said detected object in said frames of said video sequence to obtain a tracked object;
means for classifying said tracked object as a real object or a spurious object based on at least one of the following classification metrics:
  a shape consistency metric, including:
    means for extracting an enlarged view (blob) of said object for each of two frames,
    means for creating a mask for each blob,
    means for computing a centroid for each blob,
    means for aligning said masks by said centroids, whereby an aligned mask is created; and
    means for computing an overlap ratio from said aligned mask from a number of overlapping pixels in the aligned mask and a total number of pixels in said aligned mask,
  a size consistency metric, including:
    means for measuring a number of pixels in said detected object in each of two frames; and means for computing the ratio of said number of pixels in each of said two frames, a texture consistency metric, a color consistency metric, including: means for computing an instantaneous speed of said object in two frames; and computing a speed consistency metric based on a change in said instantaneous speed in said two frames, an intensity consistency metric, a speed consistency metric, a direction of motion consistency metric, including:
  means for computing an instantaneous direction of motion of said object in two frames and
  means for computing a direction of motion consistency metric based on a change in said instantaneous direction of motion in said two frames, a salient motion metric, an absolute motion metric, or a persistent motion metric of said tracked object.

30. A system as in claim 29, wherein said object is classified based on at least two of said classification metrics.

31. A system as in claim 30, wherein said object is classified based on at least three of said classification metrics.

32. A system as in claim 31, wherein said object is classified based on at least four of said classification metrics.

33. A computer-readable medium as in claim 1, wherein classifying said object based on an intensity consistency metric comprises:
  computing an intensity histogram of said object in a plurality of frames, wherein said intensity histogram for n previous frames is a vector with m elements, where each element represents a value of said intensity histogram;
  computing an intensity consistency vector using intensity histogram vectors for two frames; and
  computing an intensity consistency metric based on said intensity consistency vector and m.

* * * * *